United States Patent Office 3,461,175
Patented Aug. 12, 1969

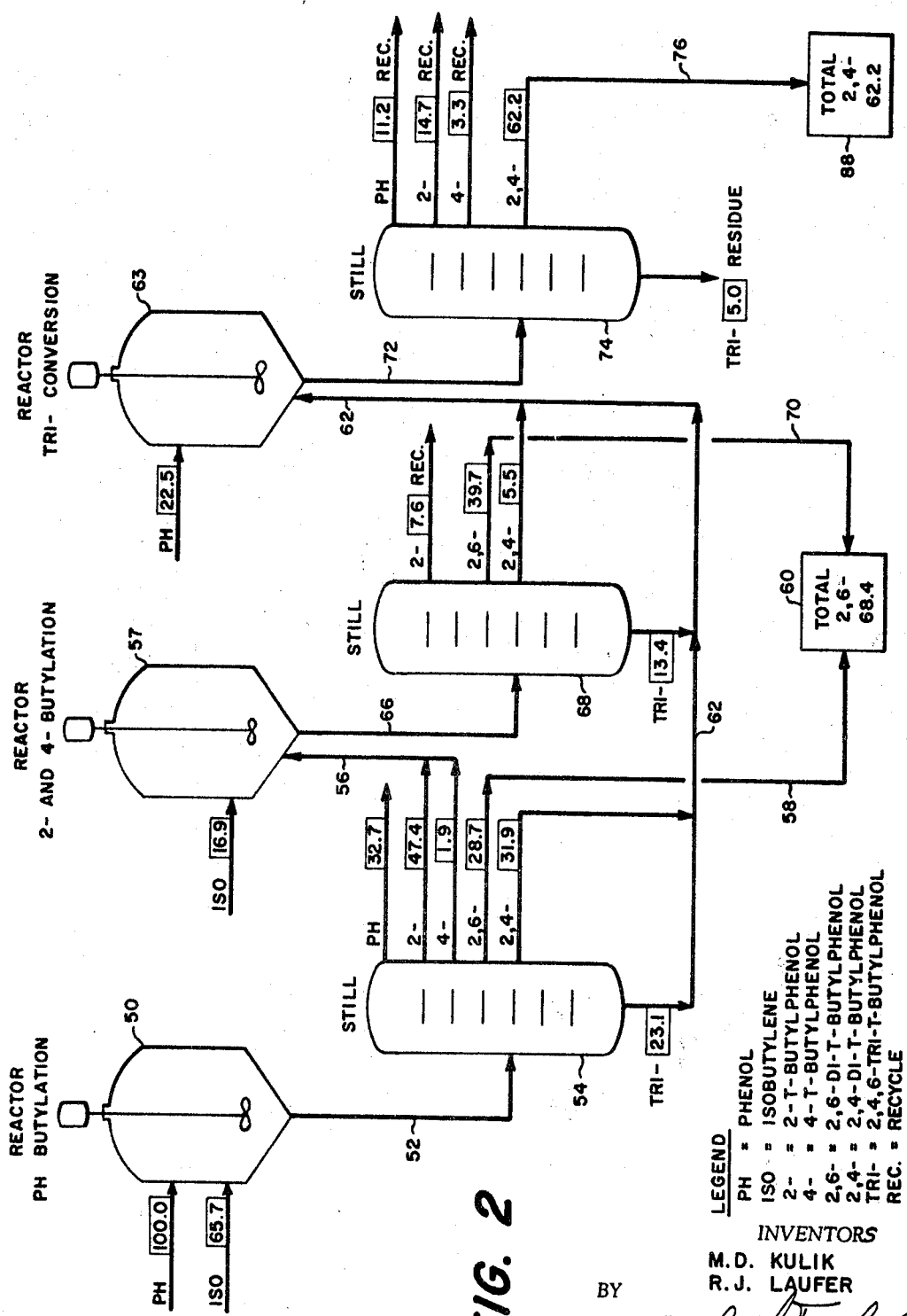

3,461,175
PREPARATION OF 2,6-DI-TERT-BUTYLPHENOL
Metro D. Kulik and Robert J. Laufer, Pittsburgh, Pa., assignors, by mesne assignments, to Consolidation Coal Company, Pittsburgh, Pa., a corporation of Delaware
Filed July 28, 1965, Ser. No. 475,514
Int. Cl. C07c 37/14, 39/06
The portion of the term of the patent subsequent to Dec. 24, 1985, has been disclaimed
U.S. Cl. 260—624                                                                       1 Claim

ABSTRACT OF THE DISCLOSURE

The preparation of 2,6-di-tert-butylphenol from 2-tert-butylphenol by first butylating the 2-tert-butylphenol to form a product containing 2,6-di-tert-butylphenol, 2,4-di-tert-butylphenol and 2,4,6-tri-tert-butylphenol, and then selectively reconverting the 2,4-di-tert-butylphenol and 2,4,6-tri-tert-butylphenol contained in the product to 2-tert-butylphenol for recycling to the butylation step.

---

Figure 1:
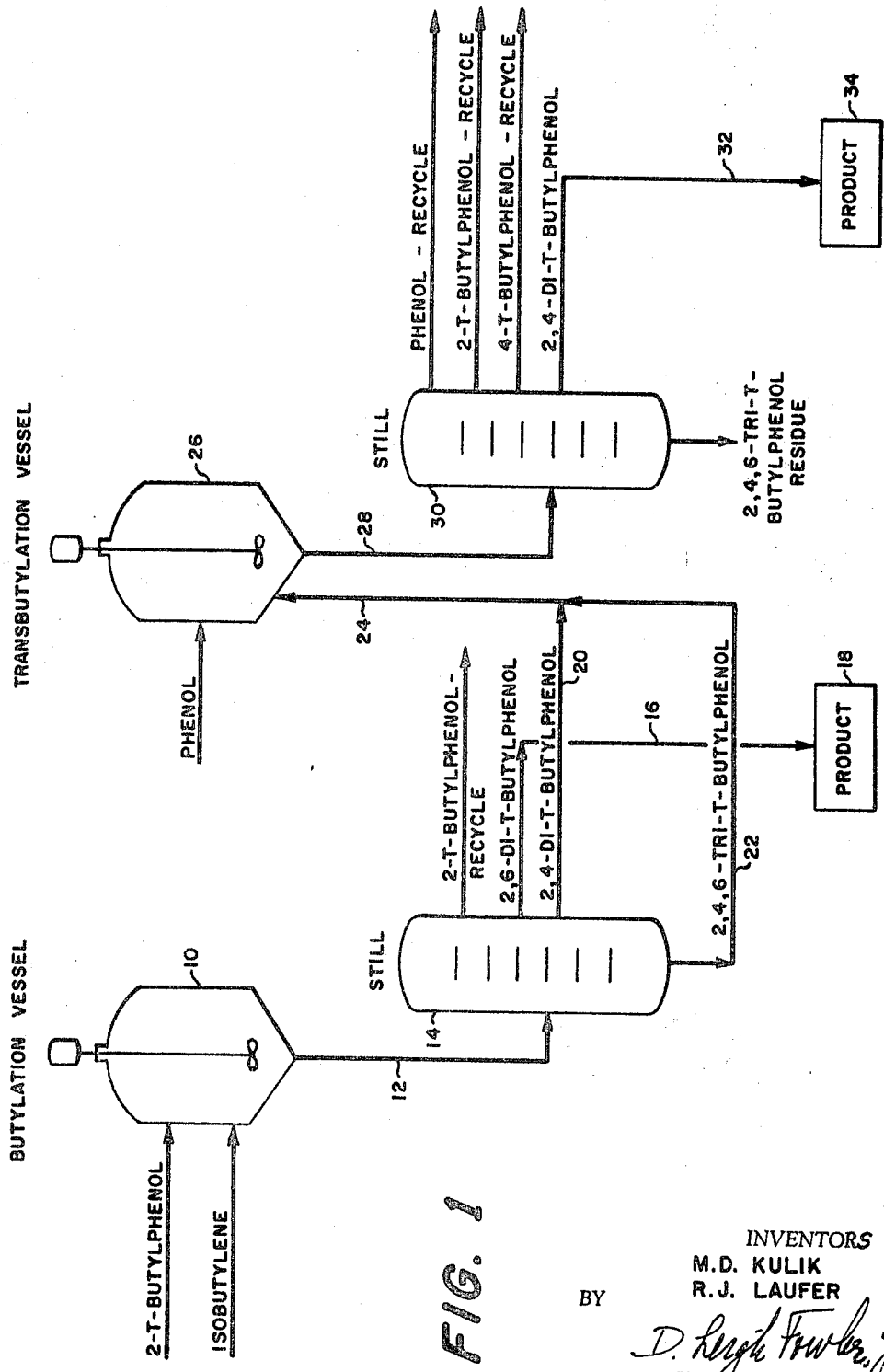

This invention relates to a combined butylation-transbutylation process, and more particularly to a combined process for producing 2,6-di-tert-butylphenol in high yield, with the simultaneous production of 2,4-di-tert-butylphenol as only by-product in any appreciable quantity.

These compounds are useful either as antioxidants for lubricants, or as intermediates for the preparation of antioxidants for lubricants. For example, 2,6-di-tert-butylphenol is a necessary ingredient in the preparation of 4,4′-methylenebis-2,6-di-tert-butylphenol, an antioxidant for lubricating oils. Likewise, 2,4-di-tert-butylphenol is a necessary ingredient in the preparation of 2,2′-methylenebis-2,4-di-tert-butylphenol, another antioxidant for lubricating oils.

Of the two compounds, namely, 2,6-di-tert-butylphenol and 2,4-di-tert-butylphenol, the former is the more desirable commercially. Accordingly, a process which yields 2,6-di-tert-butylphenol in high yield with essentially no by-products other than 2,4-di-tert-butylphenol, and even that only in minor amount, would be highly desirable commercially. However, the processes hitherto available for making butylated phenols have produced the spectrum of butylphenols including 2,4,6-tri-tert-butylphenol in appreciable quantity. The problem presented by the latter compound is well defined in the following statement from U.S. Patent No. 3,133,974, column 1, lines 46 to 60: "The compound 2,4,6-tri-tert-butylphenol which is readily formed when phenol is alkylated with isobutylene is a millstone because there is no particular present commercial outlet for this material and it cannot be economically converted back into the above three desired, commercially important tertiary butylphenols. Therefore, the conversion of phenol into 2,4,6-tri-tert-butylphenol represents a distinct waste, both of valuable raw materials and of throughput in a commercial operation. As a consequence, there is a distinct need in the art for a low temperature process whereby phenol and isobutylene can be selectively converted into significant quantities of ortho-tert-butylphenol, 2,4-di-tert-butylphenol and 2,6-di-tert-butylphenol without the formation of excessive quantities of 2,4,6-tri-tert-butylphenol." The patentee then describes a process for the effective suppression of the production of 2,4,6-tri-tert-butylphenol.

In our copending application, S.N. 475,587 filed of even date herewith, we have described a process for effectively converting 2,4,6-tri-tert-butylphenol to ortho-tert-butylphenol and 2,4-di-tert-butylphenol, with minor amount only of 4-tert-butylphenol. This process comprises the reaction of phenol with 2,4,6-tri-tert-butylphenol under conditions favoring the formation of 2-tert-butylphenol.

In accordance with the present invention, in its broadest aspect, we have combined the above-mentioned transbutylation reaction of phenol and 2,4,6-tri-tert-butylphenol with the butylation of 2-tert-butylphenol under o-alkylating conditions, with appropriate recycle of selected products to yield 2,6-di-tert-butylphenol as the major product with 2,4,-di-tert-butylphenol as the only by-product of any appreciable quantity. In the preferred embodiment of our invention, the starting raw material is phenol which is converted, in the first stage, to 2-tert-butylphenol.

For a better understanding of our invention, its objects and advantages, reference should be had to the following detailed description of two embodiments thereof, together with the drawings, in which FIGURE 1 is a schematic flowsheet of a generalized embodiment of our invention; and FIGURE 2 is a schematic flowsheet of the preferred embodiment of our invention.

Referring to FIGURE 1, the flowsheet of an embodiment of our process in its broadest aspect is presented. A phenolic feedstock containing 2-tert-butylphenol is reacted with isobutylene in a stirred butylation vessel 10. The reaction is conducted in the presence of an alkylating catalyst and under ortho-alkylating conditions, that is, conditions favoring the formation of ortho-substituted phenols. Ortho-alkylating catalysts and conditions are described in detail in a number of United States patents. By way of illustration, the following patents describe some of such ortho-alkylating catalysts and conditions. U.S. Patent No. 2,831,898 describes the use of aluminum salts of phenols as effective ortho-alkylating catalysts. The use of concentrated sulfuric acid as an ortho-alkylating catalyst is set forth in U.S. Patent No. 2,836,627. HF-treated aluminum silicate is disclosed for similar use in U.S. Patent No. 2,874,193. In like manner, aluminum halides under special conditions are disclosed in U.S. Patent No. 2,923,745; aluminum thiophenoxides in U.S. Patent No. 3,032,595; and dialkyl sulfates and alkyl and benzene sulfonic acids in U.S. Patent No. 3,116,336.

The product obtained by reacting 2-tert-butylphenol with isobutylene under ortho-alkylating conditions contains unreacted 2-tert-butylphenol, 2,6-di-tert-butylphenol, 2,4-di-tert-butylphenol, and 2,4,6-tri-tert-butylphenol. This product is conducted by a pipe 12 to a fractionating still 14. In this still, the unreacted 2-tert-butylphenol is recovered and recycled to the butylation vessel 10. The desired 2,6-di-tert-butylphenol is separated in good purity and conducted by a pipe 16 to a suitable product storage tank 18. The higher boiling phenols, 2,4-di-tert-butylphenol and 2,4,6-tri-tert-butylphenol are recovered and withdrawn through pipes 20 to 22 respectively to a common pipe 24 which leads to a stirred transbutylation vessel 26. The two phenol products are reacted in this vessel with phenol in the presence of alkylating catalysts under conditions favoring ortho-alkylation. These catalysts and conditions are essentially the same as those described in the above-listed U.S. patents. The product of the transbutylation reaction is conducted through a pipe 28 to a fractionating still 30. Phenol is recovered in this still and recycled to the transbutylation vessel 26. Similarly, 2-tert-butylphenol is recovered, but is recycled to the butylation vessel 10. There is some 4-tert-butylphenol recovered, and this is recycled to the butylation vessel 10 for conversion to 2,4-di-tert-butylphenol and 2,4,6-tri-tert-butylphenol. Some 2,4,6-tri-tert-butylphenol is recovered which may, if desired, be recycled to the transbutylation vessel 26. The 2,4-di-tert-butylphenol is recovered and pumped through a pipe 32 to a suitable product storage tank 34. If desired, some of the latter compound may be recycled to the transbutylation vessel 26. Thus, it will be readily apparent that the described integrated process provides means for flexible control of the yield of 2,6-di-tert-butylphenol, maximizing its production and minimizing, if not altogether eliminating, the production of the associated by-products.

Preferred embodiment

FIGURE 2 is a schematic flowsheet of the preferred embodiment of this invention. In the preferred embodiment, concentrated sulfuric acid is used as the catalyst in both the butylation and the transbutylation reactions. In FIGURE 2, the numbers in the boxes designate the parts by weight of the associated compounds. The latter, for convenience, are indicated by abbreviations of words as set forth in the legend in the lower left-hand corner. Thus the flowsheet also presents a complete material balance of a specific example of the process.

Phenol and isobutylene in the indicated quantities and dissolved in toluene are reacted in a phenol butylation reactor 50 in the presence of catalytic quantities of concentrated sulfuric acid at a temperautre of 90° C. This reaction is generally and specifically described in our copending application Ser. No. 477,653 entitled "Ortho-Tertiary Butylation of Phenols," filed of even date herewith. In the conduct of the reaction, the sulfuric acid is added in small increments from time to time to maintain the described reaction rate, while the isobutylene is added at such a rate that it is absorbed as fast as it is introduced. The reaction is discontinued before all the phenol has been reacted and also before the total amount of sulfuric acid added to the reactor is equal to 0.5 percent by weight of the phenol. After such discontinuance, the reaction mixture is maintained at the reaction temperature for a half-hour or so to permit at least some of any ethers that may have formed to convert to ring-alkylated products, and some of the tri-substituted phenol to convert to ortho-alkylated products. A small excess of aqueous caustic is then added to the stirred reaction mixture to neutralize the sulfuric acid.

The general conditions prescribed for the foregoing reaction are as follows:

Solvent _____ Non-polar hydrocarbon, e.g. toluene, meta-xylene, pseudocumene and iso-octane.
Mole ratio (isobutylene/phenol) _____ 0.5 to 2.5.
Temperature _____ 75 to 140° C., preferably about 90° C.
Pressure _____ Preferably atmospheric, but higher if solvent requires same to remain liquid.
Amount of $H_2SO_4$ (96%) __ Added in increments of less than 0.05 weight percent of phenol up to a cumulative total of about 0.5% by weight of the phenol.

The product of the butylation reaction in vessel 50 is withdrawn through a pipe 52 to a fractionating still 54 for separation and distribution of the phenolic compounds in the following manner. The unreacted phenol is recycled to vessel 50. Both the 2-tert-butylphenol and the 4-tert-butylphenol, which is present in relatively small amount, are conducted through a pipe 56 to a second butylation vessel 57 for further reaction with isobutylene, as will be momentarily described. The desired 2,6-di-tert-butylphenol is conducted through a pipe 58 to a suitable product storage tank 60. The high boiling 2,4-di-tert-butylphenol and 2,4,6-tri-tert-butylphenol are combined and transported via a pipe 62 to a transbutylation reactor 63 wherein the two compounds are reacted with phenol, as will also be described shortly.

Returning now to the butylation reactor 57, the reaction therein between isobutylene and the mixture of the two phenols, predominantly 2-tert-butylphenol with a minor amount of 4-tert-butylphenol, is conducted in the presence of concentrated sulfuric acid under substantially the same conditions as those maintained in the first butylation reactor 50, with the one exception that the number of sulfuric acid increments may be fewer and larger, both individually and collectively, as described in our aforementioned copending application. The product from this reaction, after neutralization with caustic, is withdrawn through a pipe 66 to a fractionating still 68 wherein the component phenols are separated and then distributed as follows. The 2-tert-butylphenol is recycled to the reactor 57. The 2,6-di-tert-butylphenol is conducted via pipe 70 to the tank 60 to complete the production of this desired compound. The phenols 2,4-di-tert-butylphenol and 2,4,6-tri-tert-butylphenol are recovered and conducted through pipe 62 to the transbutylation vessel 63.

The transbutylation of 2,4-di-tert-butyluphenol and 2,4,6-tri-tert-butylphenol is described and claimed in our copending application S.N. 475,587 entitled "Transalkylation of Certain Poly-Tert-Butylphenols" and filed on even date herewith. Briefly, the transbutylation comprises reacting the mixture of the two butylated phenols with phenol at a temperature between 75 and 150° C., preferably about 90° C., in the presence of a catalytic amount of concentrated sulfuric acid. The amount of the concentrated sulfuric acid (96 to 98 percent) is less than 0.5 percent by weight of the butylated phenols. The products of the reaction are conducted through a pipe 72 to a fractionating still 74 for separation and distribution of the following compounds; phenol, 2-tert-butylphenol, 4-tert-butylphenol, 2,4-di-tert-butylphenol and 2,4,6-tri-tert-butylphenol. The phenol is recycled to the transbutylation vessel 63. The 2-tert-butylphenol and the 4-tert-butylphenol are recycled to the second butylation vessel 57. The 2,4-di-tert-butylphenol is sent through a pipe 76 to a suitable product storage tank 78. The unconverted 2,4,6-tri-tert-butylphenol is discharged as residue from the bottom of the still. The results may be summarized as follows. From 100 parts by weight of phenol fed to the first butylation vessel 50 and 22.5 parts by weight of phenol fed to the transbutylation vessel 63, the following products were obtained,

| | Parts by weight |
|---|---|
| 2,6-di-tert-butylphenol | 68.4 |
| 2,4-di-tert-butylphenol | 62.2 |
| 2,4,6-tri-tert-butylphenol | 5.0 |

According to the provisions of the patent statues, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method of making 2,6-di-tert-butylphenol in high yield whereby the formation of by-product 2,4,6-tri-tert-butylphenol is minimized, which method comprises, in combination, the following steps:

(a) subjecting a phenolic feedstock containing 2-tert-butylphenol to an ortho-alkylation reaction with isobutylene in the presence of an alkylating catalyst in a butylation zone at a temperature in the range of from 75 to 140° C. to yield a product containing 2,6-di-tert-butylphenol, 2,4-di-tert-butylphenol and 2,4,6-tri-tert-butylphenol, (b) separating and recovering a mixture consisting essentially of 2,4-di-tert-butylphenol and 2,4,6-tri-tert-butylphenol from step (a), (c) subjecting the mixture consisting essentially of 2,4-di-tert-butylphenol and 2,4,6-tri-tert-butylphenol recovered in step (b) to a catalytic transalkylation reaction with phenol at a temperature in the range of from 75 to 150° C. and in the presence of concentrated sulfuric acid, which is present in an amount of less than 0.5 percent by weight, based on the weight of the 2,4-di-tert-butylphenol and 2,4,6-tri-tert-butylphenol present therein, to preferentially convert said phenol to 2-tert-butylphenol, (d) recycling 2-tert-butylphenol from step (c) to the butylation zone of step (a) for reprocessing, and
(e) recovering 2,6-di-tert-butylphenol.

References Cited

UNITED STATES PATENTS

| | | | |
|---|---|---|---|
| 1,972,599 | 9/1934 | Perkins et al. | 260—624 |
| 2,051,473 | 8/1936 | Evans et al. | 260—624 |
| 2,189,805 | 2/1940 | Kyrides | 260—624 |
| 2,553,538 | 5/1957 | Arnold | 260—624 |
| 3,177,259 | 4/1965 | Van Winkle | 260—624 |

BERNARD HELFIN, Primary Examiner
W. B. LONE, Assistant Examiner